United States Patent [19]

Schmidtner et al.

[11] 4,328,537
[45] May 4, 1982

[54] CIRCUIT ARRANGEMENT FOR LIMITING AND REGULATING THE COLLECTOR CURRENT OF THE CONTROL ELEMENT TRANSISTOR OF A SWITCHING NETWORK COMPONENT

[75] Inventors: Erich Schmidtner; Ratko Kosorcic, both of Munich, Fed. Rep. of Germany

[73] Assignee: Siemens Aktiengesellschaft, Berlin & Munich, Fed. Rep. of Germany

[21] Appl. No.: 242,978

[22] Filed: Mar. 12, 1981

[30] Foreign Application Priority Data

May 23, 1980 [DE] Fed. Rep. of Germany ....... 3019906

[51] Int. Cl.³ .......................................... H02M 3/335
[52] U.S. Cl. ...................................... 363/21; 363/56; 363/97
[58] Field of Search ................... 363/18–21, 363/55, 56, 97, 124, 131; 323/283, 285, 276, 277

[56] References Cited

U.S. PATENT DOCUMENTS

| | | | |
|---|---|---|---|
| 3,564,393 | 2/1971 | Williamson | 363/21 X |
| 3,571,697 | 3/1971 | Phillips | 323/285 X |
| 3,790,878 | 2/1974 | Brokaw | 323/285 X |
| 4,005,351 | 1/1977 | Blum | 363/21 X |
| 4,037,271 | 7/1977 | Keller | 363/21 |
| 4,104,714 | 8/1978 | Smith et al. | 363/21 |

Primary Examiner—William M. Shoop
Assistant Examiner—Peter S. Wong
Attorney, Agent, or Firm—Hill, Van Santen, Steadman, Chiara & Simpson

[57] ABSTRACT

An integrated regulating module for current and voltage regulation is employed in a circuit arrangement for limiting and regulating the collector current of a control transistor of a switching network component. The module comprises a pulse width modulator, a reference voltage source, an operational amplifier for current regulation, an operational amplifier for voltage regulation, a disconnect device and two dual outputs. The control transistor is connected in series with a current transformer whose secondary is connected in parallel to a series arrangement of a diode and a variable resistor, and a half-wave rectifier circuit. Two bistable switches are provided such that one input of the first bistable switch is connected to the reference voltage source of the regulating module and the other input is connected to the output of the regulating module. The output of the first bistable switch is connected to one input of the current regulating operational amplifier and the other input is connected to a tap of voltage divider which is connected across the output of the half-wave rectifier. One input of the second bistable switch is connected to the tap of the variable resistor, its other input is connected to a further reference voltage and its output is connected to drive the disconnect device of the integrated regulating module.

7 Claims, 2 Drawing Figures

CIRCUIT ARRANGEMENT FOR LIMITING AND REGULATING THE COLLECTOR CURRENT OF THE CONTROL ELEMENT TRANSISTOR OF A SWITCHING NETWORK COMPONENT

BACKGROUND OF THE INVENTION

1. Field of the Invention

The present invention relates to a circuit arrangement for limiting and regulating the collector current of a control transistor of a switching network component employing an integrated current and voltage regulator component which includes a pulse width modulator, a reference voltage source, an operational amplifier for current regulation, an operational amplifier for voltage regulation, a disconnect device and two dual outputs.

2. Description of the Prior Art

In switching network components, the protection of the switching transistors from excess current is of the greatest importance. Regulation is effected by known integrated regulating modules which permit a combined voltage and current regulation with the aid of operational amplifiers and a pulse phase modulator. This regulating module is normally operated in such a manner that with the aid of a current transformer, the operational amplifier provided for current regulation is used to detect the measured values of slow current changes. For rapid current changes or current peaks of very steep gradient, it is normal to use the input of a disconnect device, likewise contained in the integrated regulating module, or else the operational amplifier for voltage regulation. Suddenly-occurring current peaks do, in fact, result in a simultaneous blockage of the outputs, but the reverse-flowing current permits an immediate reconnection which can result in considerable oscillation processes in the collector circuit. In this case, a resistor, capacitor, diode (RCD) protective circuit of the switching transistor loses efficiency. The switching process is largely unchecked and can lead to the destruction of the switching transistor. In the case of slow current changes, the above-described processes fundamentally occur at the time of the transition from voltage regulation to current regulation. However, both forms of current detection are fundamentally required, as is an additional starting circuit relating to the increase in the pulse width of the switching transistor drive.

SUMMARY OF THE INVENTION

The object of the invention is to provide a circuit arrangement for limiting and regulating the collector current of the control transistor of a switching network component employing an integrated current and voltage regulating module which, even when the excess current threshold has responded and as a result a disconnection has taken place, prevents the reconnection of the control element within one period of the switching clock pulse train.

For realizing the above object, and according to the present invention, the circuit arrangement is designed in such a manner that the control transistor is connected in series with a current transformer which is connected in parallel at its secondary side to a series arrangement of a diode and a variable resistor, and likewise a half-wave rectifier circuit. Two bistable switches are provided. One input of the first bistable switch is connected to the reference voltage source of the integrated module and the other input is connected to the output of the integrated regulating module. The output of the first bistable switch is connected to one input of the operational amplifier for current regulation and the other input is connected to the tap of a first voltage divider connected across a portion of the half-wave rectifier. One input of the second bistable switch is connected to the tap of the variable resistor, thereby sensing current with respect to a preset desired maximum, and the other input is connected to a further reference voltage. The output of the second bistable switch is connected to the input of the disconnect device of the integrated regulating module.

The above measures serve to detect the instantaneous value of the current flowing through the switching transistor and thus instigate an effective and reliable current regulation. In addition, it is ensured that once the excess current threshold has responded, within the normal switch-on phase, a multiple switching process and a possible frequency halving, followed by unchecked switching behavior of the control transistor is prevented.

The regulating arrangement can be designed in such a manner that the second-mentioned input of the second bistable switch is connected to the tap of a voltage divider which is connected parallel to the switching network component output.

The above measure results in a floating bias voltage whereby a return of the load current to 10% of the nominal current can be achieved.

In order to facilitate a reliable starting of the circuit, which must take place in current limitation, the other input of the second bistable switch can simultaneously be connected by way of a resistor to an auxiliary voltage.

The output of the first bistable switch can also be connected to the tap of a third voltage divider connected in parallel with the switching network component output. In this manner, it is possible to precisely determine the length of time within a period in which reconnection is to be prevented.

It is also advantageous to connect the output of the second bistable switch to the tap of a fourth voltage divider which is connected between the auxiliary voltage and ground.

Operational amplifiers can be used for the bistable switches.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
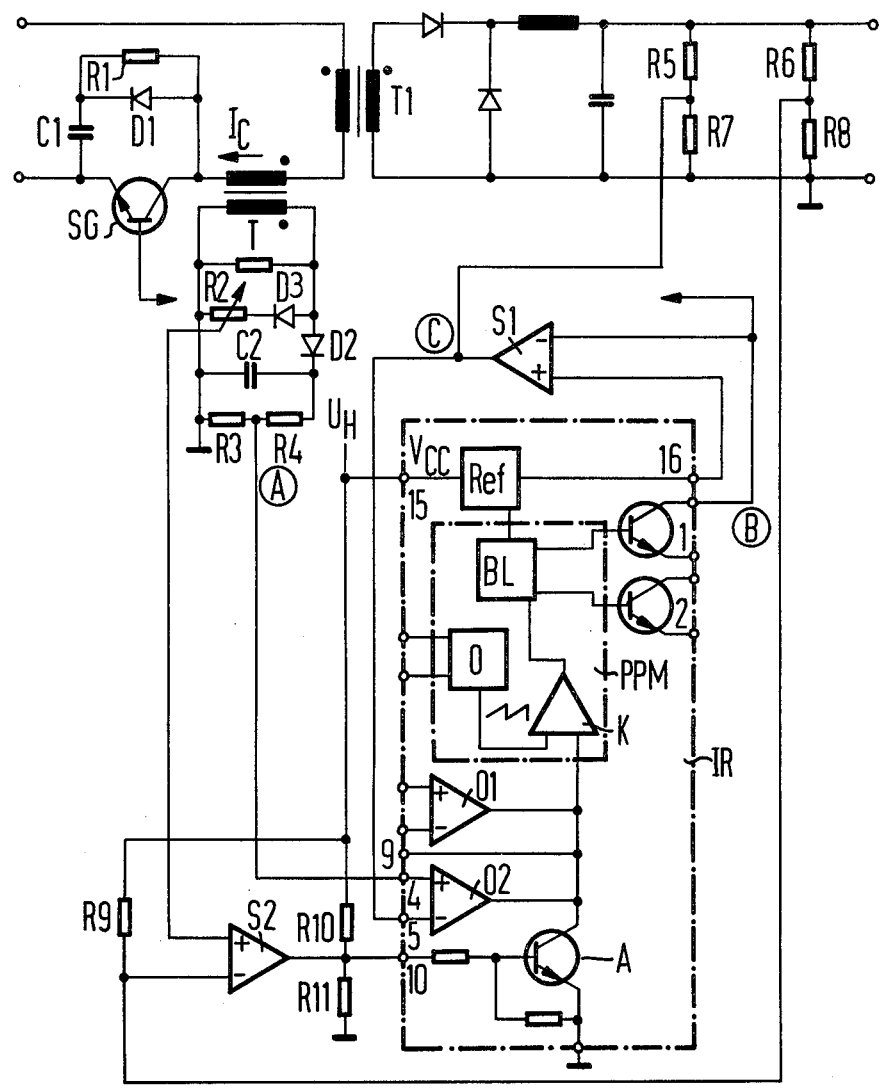
FIG. 1 is a circuit diagram of a switching network component and a regulating module, connected and operating in accordance with the present invention.

The switching network component contains a control element SG, designed as a transistor, with the so-called RCD protective circuit which comprises a capacitor C1, a resistor R1 and a diode D1 connected across the emitter-collector path of the transistor. The mode of operation of the protective circuit RCD is known in the art and is described, for example, in the periodical "Valvo Berichte", Edition 18, Vol. ½, on Page 150 in association with FIG. 11.

The primary winding of a linear current transformer T is connected in series with the control transistor SG and the primary winding of a transformer T1 which serves to separate the rectifier component from the switching regulator component. The secondary winding of the current transformer T is connented in parallel with a series arrangement of a diode D3 and a variable resistor R2, and likewise a half-wave rectifier comprising a diode D2 and a charging capacitor C2. The first voltage divider R3, R4 is connected in parallel to the charging capacitor C2.

The regulating module, which can comprise, for example, a module of the type designated SG3524 and manufactured by Silicon General and Texas Instruments, basically comprises a reference voltage source REF, a pulse width modulator PPM, an operational amplifier 01 for voltage regulation, an operational amplifier 02 for current regulation, and a disconnect device A which fundamentally represents a switching transistor. The pulse width modulator PPM, in turn, comprises a sawtooth oscillator, a comparator, and an internal module logic. The regulating module also comprises two dual outputs 1 and 2.

A second voltage divider R6, R8 and a third voltage divider R5, R7 are arranged at the output of the switching network component.

A first bistable switch S1, which in this exemplary embodiment comprises an operational amplifier, is connected by one of its inputs to the reference voltage source REF of the regulating module, and by its other input to the output 1 of the regulating module. The output of the first bistable switch S1 is connected to one input of the operational amplifier for current regulation 02 of the regulating module IR. The other input of the operational amplifier 02 is connected to the tap of the first voltage divider R3, R4.

A second bistable switch S2, which may also be an operational amplifier, has its output connected to the disconnect device A. One input of the bistable switch S2 is connected to the tap of the second voltage divider R6, R8 and the other input is connected by way of a resistor R9 to an auxiliary voltage UH. At the same time, the auxiliary voltage UH is supplied to a fourth voltage divider R10, R11 which has its tap connected to the output of the second bistable switch S2.

The circuit operates as follows. The collector current IC of the control transistor SG flows across the linear current transformer T and thus produces a direct image thereof at the secondary side. If the collector current exceeds the instantaneous value set by the resistor R2, the switch S2 switches to a positive voltage level and by way of the terminal 10 directly triggers the disconnection of the output 1 so that the latter switches to a positive potential. The output of the switch S1 subsequently switches the input 5 of the operational amplifier 02 for current regulation to a potential which is lower than that applied to its input 4. As a result of the disconnection of the collector current, the input 4 now follows the discharge curve of the capacitor C2 and as a result of the discharge time constant remains positive in relation to the input 5 for a longer period of time than the maximum possible keying ratio of 48% can occur. This means that during this phase, renewed connection is prevented. It is only the natural connection process which occurs on the basis of the predetermined frequency and the associated renewed current measurement which determines whether an earlier or later disconnection than previously is required.

Figure 2:
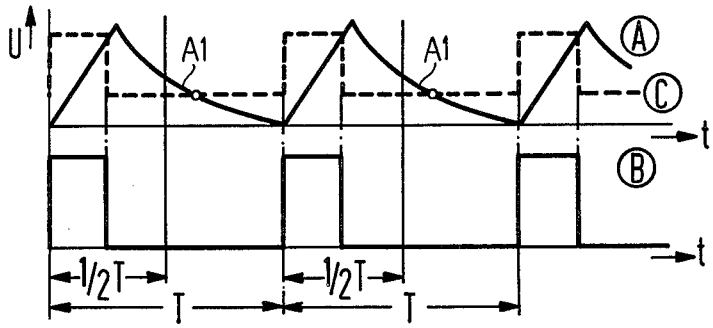
FIG. 2 is a graphic illustration of the fundamental voltage wave forms for the circuit of FIG. 1.

The processes may be seen from the pulse diagram of FIG. 2. Here, the regulated clock pulse at the output 1 of the regulator is referenced B. Then, the voltage curve C occurs at the output of the first bistable switch S1. The voltage curve at the output of the half-wave rectifier is referenced A. The curve A clearly indicates the linear rise in current until the disconnection by the bistable switch S2 and the subsequent discharge curve. For such time as the voltage at the tap of the first voltage divider R3, R4 is more positive than the voltage at the output of the first bistable switch S1, the control element remains blocked and, consequently, the switching network component remains disconnected. Reconnection cannot occur until the following period. The third voltage divider R5, R7 establishes the intersection point between the decaying portion of the curve A1 and the curve C. This prevents reconnection taking place during this phase. It is only the natural connection process which takes place on the basis of the established frequency and the associated renewed current measurement that decides whether an earlier or later disconnection than previously is required. The use of the second voltage divider R6, R8 at the output voltage side can cause the load current to return to 10% of the nominal current since the bias voltage prevailing at the second bistable switch S2 is therefore floating so that the reconnection point undergoes a shift. The resistor R9 is required to allow the starting of the circuit which takes place in current limitation. A separate starting circuit is therefore not required.

The advantages of this circuit are fundamentally that the measurement and transmission of the instantaneous value of the collector current of the regulating transistor are effected without delay to the input of the disconnect device of the module whereby an extremely sharp starting point for current limitation and regulation is achieved and direct disconnection is immediately triggered via the internal logic BL of the module.

The connection of the inputs 4 and 5 of the operational amplifier 02 for current regulation with the described blocking function as shown in the diagram of FIG. 2 prevents multiple switching processes of the module and thus of the switching transistor, possibly halving of the switching frequency, and thus permits a higher degree of reliability. Because of the high resistance to short circuits, starting can occur via the current regulation.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for limiting and regulating the collector current of a transistor having a collector, an emitter and a base and in a switching network component which comprises a current transformer including a primary connected in series with the collector and a secondary, said circuit arrangement comprising:

a variable resistor, including a first tap, and a diode connected in series, the series combination connected across said secondary, the setting of said variable resistor representing the maximum collector current;
a half-wave rectifier, including a charging capacitor, connected across the secondary;
a voltage divider, including a second tap, connected across said charging capacitor;
first and second bistable switches, each including first and second inputs and an output;
an integrated regulating module including a reference voltage source, a current regulating operational amplifier having first and second inputs and an output, a disconnect device including an input and operable to disconnect the collector current, and at least one output connected to and controlling said base;
said first input of said first bistable switch connected to said reference voltage source, said second input of said first bistable switch connected to and driven by said module output, and said output of said first bistable switch connected to said second input of said current regulating operational amplifier, said first input of said current regulating operational amplifier connected to and sensing the voltage at said second tap as representing the voltage across said charging capacitor; and
said first input of said second bistable switch connected to a reference potential, said second input of said second bistable switch connected to said first tap to sense whether the collector current is above the set maximum, and an output connected to drive said input of said disconnect device.

2. The circuit arrangement of claim 1, wherein said first bistable switch comprises:
an operational amplifier.

3. The circuit arrangement of claim 1, wherein said second bistable switch comprises:
an operational amplifier.

4. The circuit arrangement of claim 1, wherein said first and second bistable switches each comprise:
an operational amplifier.

5. The circuit arrangement of claim 1, and further comprising:
a switching network component output including another voltage divider having a third tap connected to said first input of said second bistable switch.

6. The circuit arrangement of claim 5, and further comprising:
a resistor connecting said first input of said second bistable switch to the reference potential.

7. The circuit arrangement of claim 6, and further comprising:
a further voltage divider connected between the reference potential and ground and including a tap connected to said output of said second bistable switch and said input of said disconnect device.

* * * * *